United States Patent
Claus et al.

(10) Patent No.: US 10,817,938 B2
(45) Date of Patent: Oct. 27, 2020

(54) SYSTEMS AND METHODS FOR ROUTING TRADING ORDERS

(71) Applicant: BGC PARTNERS, INC., New York, NY (US)

(72) Inventors: Matthew W Claus, Summit, NJ (US); Joseph C Noviello, Summit, NJ (US)

(73) Assignee: BGC PARTNERS, INC., New York, NY (US)

(*) Notice: Subject to any disclaimer, the term of this patent is extended or adjusted under 35 U.S.C. 154(b) by 0 days.

(21) Appl. No.: 14/075,306

(22) Filed: Nov. 8, 2013

(65) Prior Publication Data

US 2014/0195402 A1    Jul. 10, 2014

Related U.S. Application Data

(63) Continuation of application No. 13/412,063, filed on Mar. 5, 2012, now Pat. No. 8,583,540, which is a continuation of application No. 12/953,407, filed on Nov. 23, 2010, now Pat. No. 8,131,630, which is a continuation of application No. 11/146,646, filed on Jun. 7, 2005, now Pat. No. 7,840,477.

(51) Int. Cl.
*G06Q 40/04* (2012.01)

(52) U.S. Cl.
CPC .................... *G06Q 40/04* (2013.01)

(58) Field of Classification Search
CPC ........ G06Q 40/00; G06Q 40/02; G06Q 40/04; G06Q 40/08
USPC .......................................... 705/35, 36 R, 37
See application file for complete search history.

(56) References Cited

U.S. PATENT DOCUMENTS

| | | | |
|---|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 5,077,665 A | 12/1991 | Silverman et al. |
| 5,101,353 A | 3/1992 | Lupien et al. |
| 5,136,501 A | 8/1992 | Silverman et al. |
| 5,297,031 A | 3/1994 | Gutterman et al. |

(Continued)

FOREIGN PATENT DOCUMENTS

| | | |
|---|---|---|
| AU | 2008/200781 | 3/2008 |
| EP | 0388162 | 3/1990 |

(Continued)

OTHER PUBLICATIONS

Biais et al.: Imperfect Competition in Financial Market: Island vs Nasdaq, Nov. 2003, Carnegie Mellon University, pp. 1-41. (Year: 2003).*

(Continued)

*Primary Examiner* — Bijendra K Shrestha

(57) ABSTRACT

Systems and methods are provided for routing trading orders. The system determines that a first trading entity disclosed to the trading platform a reserve quantity of a first trading order received from the first entity. The system determines that a second trading entity did not disclose a reserve quantity of a second trading order received from the second trading entity. The system receives a third trading order. The system preferences the first trading entity over the second trading entity in the routing of trading orders, e.g., by routing the third trading order to the first trading entity.

10 Claims, 2 Drawing Sheets

(56) References Cited

U.S. PATENT DOCUMENTS

| | | |
|---|---|---|
| 5,305,200 A | 4/1994 | Hartheimer et al. |
| 5,375,055 A | 12/1994 | Togher et al. |
| 5,717,989 A | 2/1998 | Tozzoli et al. |
| 5,727,165 A | 3/1998 | Ordish et al. |
| 5,787,402 A | 7/1998 | Potter et al. |
| 5,794,207 A | 8/1998 | Walker et al. |
| 5,873,071 A | 2/1999 | Ferstenberg et al. |
| 5,915,245 A | 6/1999 | Patterson, Jr. et al. |
| 5,924,083 A | 7/1999 | Silverman et al. |
| 5,930,762 A | 7/1999 | Masch |
| 5,950,177 A | 9/1999 | Lupien et al. |
| 5,970,479 A | 10/1999 | Shepherd |
| 6,012,046 A | 1/2000 | Lupien et al. |
| 6,014,643 A | 1/2000 | Minton |
| 6,029,146 A | 2/2000 | Hawkins et al. |
| 6,058,379 A | 5/2000 | Odom et al. |
| 6,098,051 A | 8/2000 | Lupien et al. |
| 6,112,181 A | 8/2000 | Shear |
| 6,141,653 A | 10/2000 | Conklin et al. |
| 6,173,270 B1 | 1/2001 | Cristofich et al. |
| 6,236,972 B1 | 5/2001 | Shkedy |
| 6,247,000 B1 | 6/2001 | Hawkins et al. |
| 6,278,982 B1 | 8/2001 | Korhammmer et al. |
| 6,285,989 B1 | 9/2001 | Shoham |
| 6,393,409 B2 | 5/2002 | Young et al. |
| 6,405,180 B2 | 6/2002 | Tilfors et al. |
| 6,408,282 B1 | 6/2002 | Buist |
| 6,418,419 B1 | 7/2002 | Nieboer et al. |
| 6,421,653 B1 | 7/2002 | May |
| 6,505,175 B1 | 1/2003 | Silverman et al. |
| 6,519,571 B1 | 2/2003 | Guheen |
| 6,532,460 B1 | 3/2003 | Amanat et al. |
| 6,536,935 B2 | 3/2003 | Parunak et al. |
| H2064 H | 5/2003 | Buchalter |
| 6,601,044 B1 | 7/2003 | Wallman |
| 6,606,744 B1 | 8/2003 | Mikurak |
| 6,615,188 B1* | 9/2003 | Breen .................. G06Q 40/04 705/37 |
| 6,618,707 B1 | 9/2003 | Gary |
| 6,625,583 B1 | 9/2003 | Silverman et al. |
| 6,629,082 B1 | 9/2003 | Hambrecht et al. |
| 6,731,729 B2 | 5/2004 | Eng et al. |
| 6,772,132 B1 | 8/2004 | Kemp, II et al. |
| 6,829,589 B1 | 12/2004 | Saliba |
| 6,847,934 B1 | 1/2005 | Lin et al. |
| 6,871,191 B1 | 3/2005 | Kinney, Jr. et al. |
| 6,909,941 B2 | 6/2005 | Scott et al. |
| 6,938,011 B1 | 8/2005 | Kemp, II et al. |
| 6,963,856 B2 | 11/2005 | Lutnick et al. |
| 6,983,011 B1 | 1/2006 | Hara et al. |
| 6,983,260 B2 | 1/2006 | Hummelgren |
| 7,035,819 B1 | 4/2006 | Gianakouros et al. |
| 7,035,820 B2 | 4/2006 | Goodwin et al. |
| 7,058,602 B1 | 6/2006 | La Mura et al. |
| 7,110,969 B1 | 9/2006 | Bennett et al. |
| 7,110,975 B2* | 9/2006 | Marks de Chabris ...................... G06Q 40/00 705/35 |
| 7,113,924 B2* | 9/2006 | Fishbain ............... G06Q 40/00 705/37 |
| 7,127,424 B2 | 10/2006 | Kemp, II et al. |
| 7,152,037 B2 | 12/2006 | Smith |
| 7,162,447 B1 | 1/2007 | Cushing |
| 7,181,419 B1 | 2/2007 | Mesaros |
| 7,197,483 B2 | 3/2007 | Brady et al. |
| 7,209,896 B1 | 4/2007 | Serkin et al. |
| 7,213,000 B2 | 5/2007 | Gutierrez et al. |
| 7,231,363 B1 | 6/2007 | Hughes et al. |
| 7,242,669 B2 | 7/2007 | Bundy et al. |
| 7,246,092 B1* | 7/2007 | Peterson ............... G06Q 20/10 705/35 |
| 7,277,868 B2 | 10/2007 | Terashima |
| 7,310,620 B2 | 12/2007 | Moore et al. |
| 7,330,834 B1* | 2/2008 | LaPierre ............... G06Q 40/00 705/35 |
| 7,383,220 B1 | 6/2008 | Keith |
| 7,386,497 B1 | 6/2008 | Gooch |
| 7,392,214 B1 | 6/2008 | Fraser et al. |
| 7,401,044 B1 | 7/2008 | Fraser et al. |
| 7,536,338 B2 | 5/2009 | Guler et al. |
| 7,571,132 B2 | 8/2009 | Cole |
| 7,574,395 B2 | 8/2009 | Sweeting |
| 7,587,346 B2 | 9/2009 | Malitzis |
| 7,653,584 B2 | 1/2010 | Schmitz et al. |
| 7,693,775 B2* | 4/2010 | Korhammer .......... G06Q 40/04 705/37 |
| 7,769,652 B1 | 8/2010 | Monroe |
| 7,818,191 B2 | 10/2010 | Lutnick |
| 7,835,987 B2 | 11/2010 | Daley et al. |
| 7,840,477 B2 | 11/2010 | Claus et al. |
| 7,979,339 B2 | 7/2011 | Claus et al. |
| 8,407,116 B1 | 3/2013 | Serkin |
| 8,463,649 B2 | 6/2013 | Lutnick et al. |
| 8,484,122 B2 | 7/2013 | Claus et al. |
| 8,494,951 B2 | 7/2013 | Claus et al. |
| 8,566,213 B2 | 10/2013 | Sweeting |
| 8,583,540 B2 | 11/2013 | Claus |
| 8,666,858 B2 | 3/2014 | Kemp et al. |
| 8,738,498 B2 | 5/2014 | Daley et al. |
| 9,805,417 B2 | 10/2017 | Kemp, II et al. |
| 2001/0037284 A1 | 11/2001 | Finkelstein et al. |
| 2001/0042040 A1 | 11/2001 | Keith |
| 2001/0049651 A1 | 12/2001 | Selleck |
| 2001/0051909 A1 | 12/2001 | Keith |
| 2001/0056396 A1 | 12/2001 | Goino |
| 2002/0010672 A1 | 1/2002 | Waelbroeck et al. |
| 2002/0016758 A1 | 2/2002 | Grigsby |
| 2002/0023037 A1 | 2/2002 | White, Jr. |
| 2002/0046127 A1 | 4/2002 | Reading et al. |
| 2002/0052822 A1 | 5/2002 | Terashima |
| 2002/0052827 A1 | 5/2002 | Waelbroeck et al. |
| 2002/0055901 A1 | 5/2002 | Gianakouros et al. |
| 2002/0073016 A1 | 6/2002 | Furbush et al. |
| 2002/0087451 A1 | 7/2002 | Rieger et al. |
| 2002/0091606 A1 | 7/2002 | Shapiro |
| 2002/0091617 A1 | 7/2002 | Keith |
| 2002/0099640 A1 | 7/2002 | Lange |
| 2002/0108141 A1 | 8/2002 | Kang et al. |
| 2002/0120546 A1 | 8/2002 | Zajac |
| 2002/0156719 A1 | 10/2002 | Finebaum et al. |
| 2002/0169703 A1 | 11/2002 | Lutnick et al. |
| 2002/0178104 A1 | 11/2002 | Hausman |
| 2002/0188548 A1 | 12/2002 | Bunda |
| 2002/0198816 A1 | 12/2002 | Gilbert et al. |
| 2003/0004858 A1 | 1/2003 | Schmitz et al. |
| 2003/0009411 A1 | 1/2003 | Ram et al. |
| 2003/0009412 A1 | 1/2003 | Furbush et al. |
| 2003/0009413 A1 | 1/2003 | Furbush et al. |
| 2003/0014351 A1 | 1/2003 | Neff et al. |
| 2003/0093343 A1 | 5/2003 | Huttenlocher et al. |
| 2003/0097325 A1 | 5/2003 | Friesen et al. |
| 2003/0101128 A1 | 5/2003 | Abernethy |
| 2003/0101130 A1 | 5/2003 | Cliff |
| 2003/0149636 A1 | 8/2003 | Lutnick et al. |
| 2003/0149661 A1 | 8/2003 | Mitchell et al. |
| 2003/0167224 A1 | 9/2003 | Periwal |
| 2003/0172024 A1 | 9/2003 | Kokis et al. |
| 2003/0177082 A1 | 9/2003 | Buckwalter |
| 2003/0177085 A1 | 9/2003 | Buckwalter et al. |
| 2003/0177086 A1 | 9/2003 | Gomber et al. |
| 2003/0216932 A1 | 11/2003 | Foley |
| 2003/0220867 A1 | 11/2003 | Goodwin et al. |
| 2003/0225646 A1 | 12/2003 | Failla et al. |
| 2003/0225674 A1 | 12/2003 | Hughes et al. |
| 2003/0229557 A1 | 12/2003 | Richmann et al. |
| 2003/0229569 A1 | 12/2003 | Nalbandian et al. |
| 2003/0236729 A1 | 12/2003 | Epstein et al. |
| 2003/0236737 A1* | 12/2003 | Kemp, II ............. G06F 19/328 705/37 |
| 2004/0019551 A1 | 1/2004 | Martyn et al. |
| 2004/0024684 A1 | 2/2004 | Montepeque |
| 2004/0034591 A1 | 2/2004 | Waelbroeck et al. |

(56) References Cited

U.S. PATENT DOCUMENTS

| | | |
|---|---|---|
| 2004/0059666 A1 | 3/2004 | Walebroeck et al. |
| 2004/0093296 A1 | 5/2004 | Phelan et al. |
| 2004/0103054 A1 | 5/2004 | Singer |
| 2004/0133526 A1 | 7/2004 | Shmueli et al. |
| 2004/0143538 A1 | 7/2004 | Korhammer et al. |
| 2004/0143542 A1 | 7/2004 | Magill et al. |
| 2004/0172337 A1 | 9/2004 | Spoonhower |
| 2004/0177024 A1 | 9/2004 | Bok et al. |
| 2004/0193496 A1* | 9/2004 | Hirota ............... G06Q 10/087 705/15 |
| 2004/0193596 A1* | 9/2004 | Defelice ............. G06F 16/345 |
| 2004/0210505 A1 | 10/2004 | Pourhamid |
| 2004/0210511 A1 | 10/2004 | Waelbroeck et al. |
| 2004/0210512 A1 | 10/2004 | Fraser et al. |
| 2004/0210514 A1 | 10/2004 | Kemp et al. |
| 2004/0215538 A1 | 10/2004 | Smith et al. |
| 2004/0236636 A1 | 11/2004 | Lutnick et al. |
| 2004/0236662 A1* | 11/2004 | Korhammer et al. ......... 705/37 |
| 2004/0254804 A1 | 12/2004 | Peterffy et al. |
| 2005/0015323 A1 | 1/2005 | Myr |
| 2005/0017710 A1 | 1/2005 | Steinich et al. |
| 2005/0027635 A1* | 2/2005 | Monroe ............... G06Q 20/10 705/37 |
| 2005/0044031 A1 | 2/2005 | Lebedev |
| 2005/0055304 A1 | 3/2005 | Lutnick et al. |
| 2005/0055305 A1 | 3/2005 | Lutnick et al. |
| 2005/0075898 A1 | 4/2005 | Wasserman et al. |
| 2005/0091142 A1 | 4/2005 | Renton |
| 2005/0119966 A1 | 6/2005 | Sandholm et al. |
| 2005/0125326 A1 | 6/2005 | Nangalia et al. |
| 2005/0125329 A1* | 6/2005 | Gerhart ............... G06Q 40/04 705/37 |
| 2005/0154630 A1 | 7/2005 | Lin et al. |
| 2005/0160032 A1 | 7/2005 | Lutnick et al. |
| 2005/0171887 A1 | 8/2005 | Daley et al. |
| 2005/0171888 A1 | 8/2005 | Daley et al. |
| 2005/0171890 A1 | 8/2005 | Daley et al. |
| 2005/0171891 A1 | 8/2005 | Daley et al. |
| 2005/0222936 A1* | 10/2005 | Panariti ............... G06Q 40/04 705/37 |
| 2005/0289043 A1 | 12/2005 | Maudlin |
| 2006/0015436 A1* | 1/2006 | Burns .................. G06Q 40/04 705/37 |
| 2006/0015441 A1 | 1/2006 | Burkhardt et al. |
| 2006/0026090 A1 | 2/2006 | Balabon |
| 2006/0059079 A1 | 3/2006 | Howorka |
| 2006/0080222 A1 | 4/2006 | Lutnick et al. |
| 2006/0085319 A1 | 4/2006 | Nangalia et al. |
| 2006/0136318 A1 | 6/2006 | Rafieyan et al. |
| 2006/0149662 A1 | 7/2006 | Nordlicht et al. |
| 2006/0190386 A1 | 8/2006 | Levy |
| 2006/0218071 A1 | 9/2006 | Sweeting |
| 2003/0253882 | 11/2006 | Adcock et al. |
| 2006/0253379 A1* | 11/2006 | Adcock ................ G06Q 40/04 705/37 |
| 2006/0253381 A1 | 11/2006 | Adock et al. |
| 2006/0253382 A1 | 11/2006 | Adcock et al. |
| 2006/0259404 A1 | 11/2006 | Brumfield et al. |
| 2006/0277136 A1* | 12/2006 | O'Connor ............ G06Q 40/00 705/37 |
| 2007/0005481 A1 | 1/2007 | Kedia et al. |
| 2007/0005484 A1 | 1/2007 | Waelbroeck et al. |
| 2007/0100734 A1 | 5/2007 | Berger et al. |
| 2007/0118464 A1 | 5/2007 | Avery |
| 2007/0130048 A1 | 6/2007 | Claus et al. |
| 2007/0130050 A1 | 6/2007 | Claus et al. |
| 2007/0156574 A1 | 7/2007 | Marynowski et al. |
| 2007/0156754 A1 | 7/2007 | Busch et al. |
| 2007/0174179 A1 | 7/2007 | Avery |
| 2007/0219898 A1 | 9/2007 | Burkhardt et al. |
| 2008/0015974 A1 | 1/2008 | Balabon |
| 2008/0097893 A1* | 4/2008 | Walsky ............... G06Q 30/0601 705/37 |
| 2008/0319891 A1 | 12/2008 | Scheinberg et al. |
| 2011/0029335 A1 | 2/2011 | Lutnick et al. |
| 2011/0071937 A1 | 3/2011 | Claus et al. |
| 2011/0270736 A1 | 11/2011 | Claus et al. |
| 2012/0209758 A1 | 8/2012 | Adcock et al. |
| 2013/0185185 A1 | 7/2013 | Tilly et al. |
| 2013/0304625 A1 | 11/2013 | Claus et al. |
| 2014/0089018 A1 | 3/2014 | Lutnick et al. |

FOREIGN PATENT DOCUMENTS

| | | | |
|---|---|---|---|
| EP | 1081614 A2 | 3/2001 | |
| GB | 2389687 | 12/2003 | |
| GB | 2411492 | 8/2005 | |
| JP | 2003-524241 | 8/2001 | |
| JP | 2002-007707 | 1/2002 | |
| JP | 2002-007782 | 1/2002 | |
| JP | 2002-063402 | 2/2002 | |
| JP | 2002-133103 | 5/2002 | |
| JP | 2002-183446 | 6/2002 | |
| JP | 2002-197283 | 7/2002 | |
| JP | 2002-203112 | 7/2002 | |
| JP | 2002-230304 | 8/2002 | |
| JP | 2002-259761 | 9/2002 | |
| JP | 2002-269349 | 9/2002 | |
| JP | 2002-542543 | 12/2002 | |
| JP | 2003-058733 | 2/2003 | |
| JP | 2003-058741 | 2/2003 | |
| JP | 2003-515824 | 5/2003 | |
| JP | 2003-522992 | 7/2003 | |
| JP | 2003-525480 | 8/2003 | |
| JP | 2003-331188 | 11/2003 | |
| JP | 3493193 | 11/2003 | |
| JP | 2003-345987 | 12/2003 | |
| WO | WO 95/006918 | 3/1995 | |
| WO | WO 00/11587 | 3/2000 | |
| WO | WO 00/26834 | 5/2000 | |
| WO | WO 00/63814 | 10/2000 | |
| WO | WO/2000/067172 | 11/2000 | |
| WO | WO/2000/077670 | 12/2000 | |
| WO | WO 01/04817 | 1/2001 | |
| WO | WO 01/09757 | 2/2001 | |
| WO | WO 01/25996 | 4/2001 | |
| WO | WO-0142951 A2 * | 6/2001 | ............ G06Q 40/04 |
| WO | WO 01/48655 A1 | 7/2001 | |
| WO | WO 01/52150 | 7/2001 | |
| WO | WO 01/54037 | 7/2001 | |
| WO | WO 01/55938 | 8/2001 | |
| WO | WO/2001/055923 | 8/2001 | |
| WO | WO 2001/057612 | 8/2001 | |
| WO | WO 01/75752 | 10/2001 | |
| WO | WO 01/77946 | 10/2001 | |
| WO | WO 2001/088808 | 11/2001 | |
| WO | WO 2001/093169 A1 | 12/2001 | |
| WO | WO-0225398 A2 * | 3/2002 | ......... G06Q 30/0633 |
| WO | WO 02/071297 A1 | 9/2002 | |
| WO | WO 02/086657 A2 | 10/2002 | |
| WO | WO 2003/001325 | 1/2003 | |
| WO | WO 2004/008296 | 1/2004 | |
| WO | WO 2004/008309 | 1/2004 | |
| WO | WO 2004/68272 | 8/2004 | |
| WO | WO 2005/083603 | 9/2005 | |
| WO | WO 2007/019404 | 2/2007 | |
| WO | WO 2008/109224 | 9/2008 | |

OTHER PUBLICATIONS

NASDAQ: Top NASDAQ Participants, Jun. 2012, pp. 1-2. (Year: 2012).*

SEC.gov: Nasdaq Market Center Systems Description, Sep. 7, 2004, pp. 1-23 (Year: 2004).*

InteractiveBrokers: Intermarket Sweep, Jun. 29, 2005, pp. 1-12 (Year: 2005).*

Biais et al.: Imperfect Cpmpetition in Financial Markets: Island vs Nasdaq, Nov. 11, 2003, Research Showcase@CMU, Carnegie Mellon University, pp. 1-41 (Year: 2003).*

U.S. Appl. No. 60/706,109, filed Aug. 5, 2005, Noviello.

U.S. Appl. No. 12/945,046, filed Nov. 12, 2010, Daley et al.

(56) References Cited

OTHER PUBLICATIONS

Notification of Transmittal of International Search Report and Written Opinion for PCT Application No. PCT/US06/30636; dated Apr. 30, 2007; 8 pages.
USPTO Office Action for U.S. Appl. No. 11/499,496, dated May 1, 2008 (12 pages).
USPTO Office Action for U.S. Appl. No. 10/767,546, dated Oct. 29, 2008 (35 pages).
USPTO Office Action for U.S. Appl. No. 10/767,588, dated Oct. 23, 2008 (8 pages).
Patent Pending U.S. Appl. No. 10/767,546 entitled System and Methods for Routing a Trading Order.
Patent Pending U.S. Appl. No. 10/767,588 entitled System and Methods for Routing a Trading Order According to Price.
Patent Pending U.S. Appl. No. 10/767,699 entitled System and Methods for Controlling the Disclosure of a Trading Order.
Patent Pending U.S. Appl. No. 10/766,965 entitled System and Methods for Avoiding Transaction Costs Associated with Trading Order.
Patent Pending U.S. Appl. No. 10/767,649 entitled System and Methods for Routing a Trading Order.
USPTO Office Action for U.S. Appl. No. 10/767,699, dated Oct. 26, 2007 (22 pages).
USPTO Office Action for U.S. Appl. No. 10/767,649, dated Mar. 3, 2008 (24 pages).
USPTO Office Action for U.S. Appl. No. 10/767,546, dated Feb. 4, 2008, (48 pages).
USPTO Office Action for U.S. Appl. No. 10/766,965, dated Feb. 7, 2008 (49 pages).
USPTO Office Action for U.S. Appl. No. 10/767,588, dated Jan. 11, 2008 (19 pages).
European Patent Office Examination Report for Application No. 05712564.3-1238; dated Nov. 14, 2007 (5 pages).
European Patent Office Examination Report for Application No. 05712566.8-1238; dated Nov. 14, 2007 (5 pages).
Notification of Transmittal of International Search Report and Written Opinion for PCT Application No. PCT/US06/30638; dated Apr. 20, 2007 (8 pages).
Vergote, et. al. How to match Trades and Quotes for NYSE Stocks, Mar. 2005 (21 pages).
Notification of Transmittal of International Search Report and Written Opinion for PCT Application No. PCT/US05/03166; dated Nov. 4, 2005 (7 pages).
Notification of Transmittal of International Search Report and Written Opinion for PCT Application No. PCT/US05/03159; dated Feb. 24, 2006, (11 pages).
Notification of Transmittal of International Search Report and Written Opinion for PCT Application No. PCT/US05/03164; dated Dec. 13, 2006 (6 pages).
Notification of Transmittal of International Search Report and Written Opinion for PCT Application No. PCT/US05/03163; dated Jan. 4, 2007 (9 pages).
Notification of Transmittal of International Search Report and Written Opinion for PCT Application No. PCT/US05/03168; dated Jan. 29, 2007 (6 pages).
Supplementary European Search Report for International Application No. PCT/US05/03166; dated Jan. 8, 2007 (3 pages).
Parlour, Christine, Price Dynamics in Limit Order Markets, Queens University, Kingston Ontario Canada, Nov. 1, 1995 (111 pages).
Weber, Bruce; Screen-Based Trading in Futures Markets: Recent Developments and Research Propositions, Abstract, ISBN 076950013, Jun. 21, 2005 (1 page).
Balance of Trade, Banking Technology, vol. 20, No. 9 ISSN 0266-0865, Nov. 1, 2004; pp. 42-44
USPTO Office Action for U.S. Appl. No. 10/767,699, dated Jul. 22, 2008 (13 pages).
Supplementary European Search Report for Application No. 05712562.7; dated Jul. 28, 2008 (2 pages).
Supplementary European Search Report for Application No. 05712563.5; dated Jul. 28, 2008 (2 pages).
USPTO Office Action for U.S. Appl. No. 11/499,496, dated Apr. 27, 2009 (3 pages).
USPTO Office Action for U.S. Appl. No. 11/499,496, dated Jan. 26, 2009 (16 pages).
USPTO Office Action for U.S. Appl. No. 11/499,833, dated May 19, 2008 (12 pages).
USPTO Office Action for U.S. Appl. No. 11/499,833, dated Nov. 14, 2008 (14 pages).
USPTO Office Action for U.S. Appl. No. 11/499,833, dated Aug. 18, 2009 (15 pages).
USPTO Office Action for U.S. Appl. No. 10/766,965, dated Nov. 21, 2008 (20 pages).
Australian Examiner's Report for AU Application No. 2006278384 dated, Aug. 5, 2009 (3 pages).
USPTO Office Action for U.S. Appl. No. 10/767,546, dated Oct. 7, 2009 (19 pages).
USPTO Office Action for U.S. Appl. No. 10/767,588, dated Oct. 27, 2009 (6 pages).
USPTO Office Action for U.S. Appl. No. 10/767,699, dated Oct. 20, 2008 (3 pages).
USPTO Examiner Interview Summary for U.S. Appl. No. 10/766,965, dated Sep. 22, 2009 (2 pages).
USPTO Office Action for U.S. Appl. No. 10/766,965, dated Oct. 28, 2009 (2 pages).
USPTO Examiner Interview Summary for U.S. Appl. No. 10/767,649, dated Jun. 23, 2009 (2 pages).
USPTO Examiner Interview Summary for U.S. Appl. No. 11/499,833, dated Sep. 3, 2009 (2 pages).
USPTO Examiner Interview Summary for U.S. Appl. No. 11/499,496, dated Jul. 27, 2009 (4 pages).
Australian Examiner's Report for Application No. 2005208980, dated Nov. 17, 2009 (2 pages).
Australian Examiner's Report for Application No. 2005208978, dated Nov. 26, 2009 (1 page).
Australian Examiner's Report for Application No. 2005208981, dated Dec. 14, 2009 (3 pages).
USPTO Office Action for U.S. Appl. No. 10/767,649, dated Aug. 27, 2009 (20 pages).
USPTO Examiner Interview Summary for U.S. Appl. No. 10/767,699, dated Dec. 23, 2009 (3 pages).
USPTO Examiner's Answer to Appeal Brief for Application No. 10/767,699, Dec. 24, 2009 (16 pages).
USPTO Examiner's Answer to Appeal Brief for U.S. Appl. No. 10/766,965, Jan. 20, 2010 (19 pages).
USPTO Notice of Allowance and Fees Due and Examiner Interview Summary for U.S. Appl. No. 11/499,496, dated Feb. 17, 2010 (89 pages).
George Simon & Kathryn Trikla, "The Regulation of Specialists and Implications for the Future," Business Lawyer, Nov. 2005, pp. 217-387.
The 'Hybrid Approach': A review of NYSE's Market Structure Proposal, Mondaq Business Briefing, NA, Dec. 9, 2004.
Australian Examiner's Report for Application No. 2006278382, dated Jul. 9, 2009 (3 pages).
USPTO Notice of Allowance and Fees Due for U.S. Appl. No. 11/499,833, dated Mar. 12, 2010 (9 pages).
New AZX Session, Trader's v10 n130, Oct. 1997, p. 4 (p. 20 of EIC search).
The New Trading Landscape for Institutional Investors, Institutional Trades Can Be Costly If Investors Aren't Careful, Norman Harris, Institutional Investor 36, 5, S1 (7) May 2002 (p. 21 of EIC search).
Scientific and Technical Information Center's Search Report EIC 3600, dated Jul. 9, 2009 (88 pages).
International Preliminary Report on Patentability for PCT Application No. PCT/US05/03164, dated Jan. 9,2007 (4 pages).
Japanese Office Action with English translation for Application No. 2006-551589, dated Apr. 20, 2010 (6 pages).
International Preliminary Report on Patentability for PCT Application No. PCT/US05/03166, dated Jul. 31, 2006 (4 pages).
Japanese Office Action with English translation for Application No. 2006-551590, dated Apr. 20, 2010 (6 pages).
International Preliminary Report on Patentability for PCT Application No. PCT/US05/03163, dated Jan. 23, 2007 (5 pages).

(56) References Cited

OTHER PUBLICATIONS

Japanese Office Action with English translation for Application No. 2006-551588, dated Apr. 27, 2010 (8 pages).
International Preliminary Report on Patentability for PCT Application No. PCT/US05/03168, dated Feb. 13, 2007 (4 pages).
Japanese Office Action with English translation for Application No. 2006-551591, dated Apr. 20, 2010 (6 pages).
International Preliminary Report on Patentability for PCT Application No. PCT/US05/03159, dated Jul. 31, 2006 (6 pages).
Supplementary European Search Report for Application No. EP 05712558, dated Dec. 5, 2008 (2 pages).
Japanese Office Action with English translation for Application No. 2006-551587, dated Apr. 20, 2010 (6 pages).
International Preliminary Report on Patentability for PCT Application No. PCT/US06/30638, dated Feb. 5, 2008 (5 pages).
International Preliminary Report on Patentability for PCT Application No. PCT/US06/30636, dated Feb. 5, 2008 (5 pages).
Donald L. Luskin, Index Options & Futures: The Complete Guide, Toyo Keizai, Inc., Aug. 9, 1990, p. 32-35 [translation of an English book, originally published by John Wiley & Sons, Inc., 1987].
EPO: "Mitteilung des Europaischen Patentamts vom 1. Oct. 2007 Ober Geschaftsmethoden =Notice from the European Patent Office dated Oct. 1, 2007 concerning business methods =Communique de l'Office europeen des brevets,en date du 1 er octobre 2007, concernant les methodes dans le domaine des activites" Journal Officiel De L'Office Europeen Des Brevets.Official Journal of the European Patent Office.Amsblatt Des Europaeischen Parentamts, OEB, Munchen, DE, vol. 30, No. 11, Nov. 1, 2007 (Nov. 1, 2007), pp. 592-593, XP0079055251SSN: 0170-9291 (2 pages).
USPTO Supplemental Notice of Allowance and Fees Due for U.S. Appl. No. 11/499,496, dated May 26, 2010 (4 pages).
USPTO Dismissal of Appeal for U.S. Appl. No. 10/766,965, filed Jun. 7, 2010 (3 pages).
European Patent Office Communication and Official Action for Application No. 05712562.7, dated May 18, 2010 (6 pages).
European Patent Office Communication and Official Action for Application No. 05712563.5, dated May 18, 2010 (6 pages).
European Patent Office Communication and Official Action for Application No. 05712558.5, dated May 18, 2010 (6 pages).
USPTO Notice of Allowance and Fees Due for U.S. Appl. No. 10/767,588, dated Jun. 25, 2010 (7 pages).
Australian Examiner's Report for Application No. 2005208979, dated Nov. 13, 2009 (2 pages).
European Patent Office Communication and Extended European Search Report for Application No. 06789488.1, dated Jul. 6, 2010 (10 pages).
European Patent Office Communication and Extended European Search Report for Application No. 06789490.7, dated Jul. 7, 2010 (8 pages).
Australian Examiner's Report for Application No. 2005208977, dated Nov. 20, 2009 (8 pages).
USPTO Office Action for U.S. Appl. No. 10/767,546, dated Aug. 6, 2010 (39 pages).
USPTO Notice of Allowance and Fees Due for U.S. Appl. No. 10/767,588, dated Jul. 22, 2010 (7 pages).
USPTO Supplemental Notice of Allowance and Fees Due for U.S. Appl. No. 11/499,496, dated Jul. 23, 2010 (9 pages).
USPTO Supplemental Notice of Allowance and Fees Due for U.S. Appl. No. 11/499,496, dated Aug. 10, 2010 (4 pages).
Japanese Office Action with English translation for Application No. 2006-551591, dated Aug. 24, 2010 (4 pages).
Japanese Office Action with English translation for Application No. 2006-551590, dated Aug. 24, 2010 (6 pages).
Daisuke Ochiai, "Electronic Finance and Security Trading, 'London Stock Exchange Transfers to New Trading System'", Capital Market Quarterly, Autumn 1997, vol. 1, No. 2, Nomura Research Institute, Nov. 1, 1997, pp. 102-108.
Japanese Office Action with English translation for Application No. 2006-551588, dated Aug. 31, 2010 (8 pages).

Japanese Office Action with English translation for Application No. 2006-551589, dated Aug. 31, 2010 (7 pages).
USPTO Notice of Allowance and Fees Due for U.S. Appl. No. 10/767,588, dated Sep. 7, 2010 (3 pages).
USPTO Notice of Allowance and Fees Due for U.S. Appl. No. 11/499,833, dated Sep. 15, 2010 (10 pages).
USPTO Notice of Allowance and Fees Due for U.S. Appl. No. 10/767,588, dated Sep. 21, 2010 (7 pages).
Australian Notice of Acceptance for Application No. 2005208980, dated Sep. 23, 2010 (3 pages).
Japanese Office Action with English translation for Application No. 2008-525266, dated Sep. 21, 2010 (7 pages).
Australian Notice of Acceptance for Application No. 2005208978, dated Nov. 30, 2010 (3 pages).
Australian Examiner's Report for Application No. 2005208977, dated Dec. 2, 2010 (1 page).
Japanese Office Action with English translation for Application No. 2008-525268, dated Nov. 24, 2010 (7 pages).
Australian Notice of Acceptance for Application No. 2005208981, dated Dec. 14, 2010 (3 pages).
Australian Notice of Acceptance for Application No. 2005208979, dated Dec. 20, 2010 (3 pages).
Japanese Office Action with English translation for Application No. 2006-551587, dated Nov. 24, 2010 (6 pages).
Japanese Office Action with English translation for Application No. 2006-551589, dated Dec. 7, 2010 (6 pages).
USPTO Office Action for U.S. Appl. No. 10/767,699, dated Dec. 22, 2010 (13 pages).
Japanese Office Action with English translation for Application No. 2006-551590, dated Jan. 11, 2011 (4 pages).
Japanese Office Action with English translation for Application No. 2006-551591, dated Jan. 11, 2011 (4 pages).
Australian Notice of Acceptance for Application No. 2006278382, dated Apr. 11, 2011 (3 pages).
USPTO Office Action for U.S. Appl. No. 10/767,546, dated May 20, 2011 (47 pages).
Japanese Office Action with English translation for Application No. 2006-551588, dated Apr. 26, 2011 (6 pages).
Japanese Office Action with English translation for Application No. 2008-525268, dated Jun. 21, 2011 (4 pages).
Japanese Office Action with English translation for Application No. 2008-525266, dated Jun. 28, 2011 (7 pages).
Japanese Office Action with English translation for Application No. 2006-551587, dated Jul. 12, 2011 (6 pages).
Australian Notice of Acceptance for Application No. 2005208977, dated Aug. 24, 2011 (3 pages).
USPTO Office Action for U.S. Appl. No. 10/767,699, dated Sep. 15, 2011 (13 pages).
Lee, et. al., "R-Trader: An Automatic Stock Trading System Based on Reinforcement Learning," The British Library, pp. 785-794, (Abstract translated).
Tan, "Using genetic algorithm to optimize an oscillator-based market timing system," The British Library, pp. B115-B122.
Ye, et. al., Application of Genetic Algorithm to Optimal Portfolio with Risk Control,: The British Library, pp. 351-354.
Steiner, et. al., "Portfolio optimization with a neural network implementation of the coherent market hypothesis," The British Library, Elsevier Science B.V., pp. 27-40; rev. Nov. 11, 1995.
Lin, et. al., "The Applications of Genetic Algorithms in Stock Market Data Mining Optimisation," Faculty of Information Technology, University of Technology, 9 pages; 2000.
Fukutome, et. al., "Bidding market based on single price model with network constraints," IEEE, pp. 1245-1250 plus 4 pages; 2004.
Wachi, et. al., "Application for Single price auction model (SPA) in AC Network," pp. 81-89; 2005.
Wallman; Technology Takes to Securities TradingIIEE, Spectrum; pp. 60-65; Feb. 1997.
Schmerken; Cybercorp to Introduce Trading via CBOE; Wall Street & technology; coversheet plus p. 50; Jan. 2000.
Zeroual; An Open Distributed Request Propagation Approach for Trading Services; Proceedings of the Second International Conference on Machine Learning and Cybernetics, Xi'an; pp. 3253-3258; Nov. 2003.

(56) References Cited

OTHER PUBLICATIONS

International Search Report and the Written Opinion for International Application No. PCT/US06/22441; 5 pages; dated May 1, 2007.
International Search Report and the Written Opinion for International Application No. PCT/US07/07602; 5 pages; dated Sep. 24, 2007.
USPTO Office Action for U.S. Appl. No. 11/398,241; 11 pages; dated Dec. 15, 2008.
USPTO Office Action for U.S. Appl. No. 11/146,646; 12 pages; dated Jan. 26, 2009.
USPTO Office Action for U.S. Appl. No. 11/398,241; 14 pages; dated Oct. 14, 2009.
USPTO Office Action for U.S. Appl. No. 11/146,646; 13 pages; dated Jan. 19, 2010.
USPTO Notice of Allowance for U.S. Appl. No. 11/146,646; 7 pages; dated Sep. 16, 2010.
Hasbrouck et al.: Limit orders and volatility in a Hybrid Market: The Island ECN, Department of Finance, Stern School, NYU, Sep. 26, 2001, pp. 1-54.
Market Access Subcommittee: Best Practices for Organized Electronic Markets, Commodity Futures Trading Commission, Nov. 27, 2001, pp. 1-22.
Bongiovanni, et al.: Lets Play Hide-and-Seek: The Location and Size of Undisclosed Limit Order Volume, The Journal of Trading, Summer 2006, pp. 34-46.
USPTO Pre-Brief Appeal Conference Decision for U.S. Appl. No. 11/398,241; 2 pages; May 17, 2010.
European Communication and Supplementary Search Report for Application No. 06772668.7 dated Aug. 20, 2009; 5 pages; (this app has been Abandoned).
AU Examination Report for Application No. 2007201453 dated Jul. 30, 2010; 1 page.
A Examination Report for Application No. 2006254819 dated Oct. 28, 2010; 2 pages.
USPTO Office Action for U.S. Appl. No. 12/953,407, dated Mar. 14, 2011 (15 pages).
European Communication and Search Report for Application No. 07754165.4 dated May 26, 2011; 9 pages.
Japanese Office Action with English translation for Application No. 2007-097157; dated Jun. 20, 2011 (4 pages).
NASDAQ: SuperMontage Release 1.0—Functional Description, Version 2.0, 2001, pp. 1-15.
Hendershott, T.: Electronic Trading in Financial Market, Jul./Aug. 2003, IT PRO, IEEE Computer Society, pp. 1-5.
USPTO Notice of Allowance and Fees Due for U.S. Appl. No. 12/953,407, dated Oct. 7, 2011 (8 pages).
USPTO Notice of Allowance and Fees Due for U.S. Appl. No. 12/953,407, dated Oct. 19, 2011 (7 pages).
USPTO Office Action for U.S. Appl. No. 13/180,010, dated Oct. 27, 2011 (15 pages).
Japanese Office Action with English translation for Application No. 2008-515959, dated Sep. 6, 2011 (6 pages).
Australian Examiner's Report for AU Application No. 2006278384 dated, May 3, 2011 (2 pages).
Japanese Notice of Allowance for Application No. 2008-525268, dated Nov. 22, 2011 (3 pages).
International Preliminary Report for International Application No. PCT/US2006/022441, dated Dec. 11, 2007 (5 pages).
International Preliminary Report for International Application No. PCT/US2007/007602, dated Oct. 8, 2008 (5 pages).
USPTO Office Action for U.S. Appl. No. 12/945,046, dated Mar. 1, 2012 (7 pages).
USPTO Examiner's Answer to Appeal Brief for U.S. Appl. No. 10/767,546, dated Sep. 14, 2012 (48 pages).
USPTO Office Action for U.S. Appl. No. 10/767,699, dated May 24, 2012 (5 pages).
Canadian Examination Report for 2,554,241 dated Aug. 6, 2012 (4 pages).
Canadian Examination Report for 2,554,244 dated May 16, 2012 (3 pages).
Canadian Examination Report for 2,554,179 dated Jan. 18, 2012 (3 pages).
Canadian Examination Report for 2,554,250 dated Jul. 30, 2012 (3 pages).
Canadian Examination Report for 2,554,468 dated Jul. 10, 2012 (6 pages).
Japanese Office Action with English translation for Application No. 2006-551587, dated Jan. 31, 2012 (9 pages).
Canadian Examination Report for 2,617,797 dated Feb. 14, 2012 (3 pages).
Canadian Examination Report for 2,617,787 dated Apr. 2, 2012 (4 pages).
Japanese Office Action with English translation for Application No. 2008-515959, dated Jul. 18, 2012 (9 pages).
European Examination Report for Application No. 07754165.4 dated Apr. 20, 2012 (7 pages).
Canadian Examination Report for 2,583,825 dated Oct. 18, 2012 (4 pages).
Japanese Office Action with English translation for Application No. 2006-551588, dated Nov. 14, 2012 (4 pages).
Japanese Office Action with English translation for Application No. 2006-551587, dated Oct. 2, 2012 (8 pages).
Australian Examiner's Report for AU Application No. 2011204904 dated Oct. 15, 2012 (3 pages).
USPTO Office Action for U.S. Appl. No. 13/412,063, dated Oct. 4, 2012 (9 pages).
USPTO Notice of Allowance for U.S. Appl. No. 12/945,046; dated Oct. 24, 2012 (6 pages).
USPTO Office Action for U.S. Appl. No. 10/767,699, dated Jan. 29, 2013 (19 pages).
Japanese Office Action with English translation for Application No. 2011-096192, dated Feb. 19, 2013 (6 pages).
USPTO Notice of Allowance and Fees Due for U.S. Appl. No. 11/499,833, dated Mar. 15, 2013 (13 pages).
Japanese Office Action with English translation for Application No. 2011-231889, dated Feb. 19, 2013 (7 pages).
USPTO Notice of Allowance and Fees Due and Examiner Interview Summary for U.S. Appl. No. 11/499,496, dated Mar. 6, 2013 (14 pages).
USPTO Office Action for U.S. Appl. No. 13/180,010, dated May 28, 2013 (4 pages).
USPTO Notice of Allowance and Fees Due for U.S. Appl. No. 10/767,546, dated Jun. 24, 2013 (11 pages).
USPTO Office Action for U.S. Appl. No. 10/766,965, dated Jun. 20, 2013 (15 pages).
USPTO Office Action for U.S. Appl. No. 10/767,649, dated Jul. 8, 2013 (10 pages).
USPTO Notice of Allowance and Fees Due for U.S. Appl. No. 13/412,063, dated Jun. 24, 2013 (22 pages).
Hong, et al., "Strategic Trading and Learning about Liquidity", 2002, Journal of Financial Markets 5, pp. 419-450.
Ayanian, et al., "The Search for Best Execution in Today's Market Environment", Jun. 6, 2002, Morgan Lewis Counselors at Law, pp. 1-18.
Canadian Examination Report for 2,609,200 dated Aug. 21, 2013 (4 pages).
Canadian Examination Report for 2,617,797 dated Oct. 17, 2013 (2 pages).
Japanese Office Action with English translation for Application No. 2011-231889, dated Sep. 3, 2013 (4 pages).
USPTO Office Action for U.S. Appl. No. 13/180,010, dated Nov. 8, 2013 (8 pages).
USPTO Notice of Allowance and Fees Due for U.S. Appl. No. 10/767,546, dated Nov. 22, 2013 (10 pages).
Canadian Examination Report for 2,554,179 dated Nov. 14, 2013 (3 pages).
Canadian Examination Report for 2,617,787 dated Nov. 22, 2013 (3 pages).
Australian Examiner's Report for AU Application No. 2012202466 dated Sep. 26, 2013 (2 pages).

(56) References Cited

OTHER PUBLICATIONS

Canadian Examination Report for 2,554,468, dated Nov. 26, 2013 (4 pages).
Australian Examination Report for 2012204120, dated Dec. 17, 2013, 3 pages.
Canadian Examination Report for 2,554,241 dated Mar. 10, 2014 (4 pages).
Canadian Examination Report for 2,554,244 dated Mar. 4, 2014 (4 pages).
USPTO Office Action for U.S. Appl. No. 10/767,699, dated Feb. 26, 2014 (18 pages).
Canadian Examination Report for 2,554,250 dated Feb. 18, 2014 (2 pages).
Australian Examination Report for 2011250751, dated Mar. 13, 2014, 3 pages.
Australian Examiner's Report for AU Application No. 2012207031 dated Feb. 12, 2014 (2 pages).
Canadian Examination Report for 2,583,825 dated Jan. 14, 2014 (4 pages).
USPTO Notice of Allowance and Fees due for U.S. Appl. No. 10/767,649, dated Jun. 23, 2014 (11 pages).
Japanese Office Action with English translation for Application No. 2011-231889, dated Mar. 25, 2014 (4 pages).
USPTO Notice of Allowance and Fees Due for U.S. Appl. No. 13/180,010, dated Apr. 22, 2014 (10 pages).
Canadian Examination Report for 2,554,179 dated Mar. 10, 2015 (4 pages).
Canadian Examination Report for 2,554,250 dated Mar. 19, 2015 (8 pages).
Canadian Examination Report for 2,554,468, dated Feb. 11, 2015 (3 pages).
Canadian Examination Report for 2,617,797 dated Dec. 4, 2014 (4 pages).
Australian Examination Report for Application No. 2014203836 dated May 5, 2015 (6 pages).
Canadian Examination Report for Application No. 2,617,787 dated Mar. 26, 2015 (5 pages).
Canadian Examination Report for Application No. 2,609,200 dated Jul. 28, 2014 (5 pages).
Allen et al.: Electronic Trading and Its Implications for Financial Systems, Nov. 15, 2001, pp. 1-24. (Year: 2001).
Lipson, Marc L.: Competition Among Market Centers, Dec. 2003, pp. 1-48. (Year: 2003).
Zhongxing Ye, Yijun Zhang, Application of Genetic Algorithm Tooptimal Portfolio With Risk Control, vol. 1, pp. 351-354, Publishing House of Electron. Ind. (Beijing, China), 1995.

\* cited by examiner

SYSTEMS AND METHODS FOR ROUTING TRADING ORDERS

CROSS-REFERENCE TO RELATED APPLICATIONS

The present application is a continuation of U.S. patent application Ser. No. 13/412,063, filed Mar. 5, 2012 entitled "Systems and Methods for Routing Trading Orders", which is a continuation of U.S. patent application Ser. No. 12/953, 407, filed Nov. 23, 2010 entitled "Trading Order Routing" (now U.S. Pat. No. 8,131,630 issued on Mar. 6, 2012), which is a continuation of U.S. patent application Ser. No. 11/146, 646 filed Jun. 7, 2005 entitled "System and Method for Routing a Trading Order Based Upon Quantity" (now U.S. Pat. No. 7,840,477 issued on Nov. 23, 2010), the disclosures of which are incorporated by reference herein in their entireties.

TECHNICAL FIELD OF THE INVENTION

The present invention relates generally to electronic trading and more specifically to a system for routing a trading order based upon quantity.

BACKGROUND OF THE INVENTION

In recent years, electronic trading systems have gained wide spread acceptance for trading of a wide variety of items, such as goods, services, financial instruments, and commodities. For example, electronic trading systems have been created which facilitate the trading of financial instruments and commodities such as stocks, bonds, currency, futures contracts, oil, and gold.

Many of these electronic trading systems use a bid/offer process in which bids and offers are submitted to the systems by a passive side and then those bids and offers are hit or lifted (or taken) by an aggressive side. For example, a passive trading counterparty may submit a "bid" to buy a particular trading product. In response to such a bid, an aggressive side counterparty may submit a "hit" in order to indicate a willingness to sell the trading product to the first counterparty at the given price. Alternatively, a passive side counterparty may submit an "offer" to sell the particular trading product at the given price, and then the aggressive side counterparty may submit a "lift" (or "take") in response to the offer to indicate a willingness to buy the trading product from the passive side counterparty at the given price.

SUMMARY OF THE INVENTION

In accordance with the present invention, the disadvantages and problems associated with prior electronic trading systems have been substantially reduced or eliminated.

An apparatus for routing trading orders comprises a memory and a processor. In one mode of operation, the memory stores first trading information associated with a first buy order placed with a first market center. The first buy order is associated with a product and the first trading information comprises a disclosed quantity of the product and a reserved quantity of the product. The memory also stores second trading information associated with a second buy order placed with a second market center. The second buy order is associated with the product and the second trading information comprises a disclosed quantity of the product and a reserved quantity of the product. The processor is coupled to the memory and receives a sell order associated with a quantity of the product. The processor further cancels at least a portion of the second buy order placed with the second market center for placement with the first market center. The canceled portion of the second buy order is determined based at least in part upon the second trading information. The processor further routes at least one additional sell order to the first market center having a quantity that is based upon at least one of the first trading information and the canceled portion of the second buy order.

In another mode of operation, the memory stores first trading information associated with a first sell order placed with a first market center. The first sell order is associated with a product and the first trading information comprises a disclosed quantity of the product and a reserved quantity of the product. The memory also stores second trading information associated with a second sell order placed with a second market center. The second sell order is associated with the product and the second trading information comprises a disclosed quantity of the product and a reserved quantity of the product. The processor is coupled to the memory and receives a buy order associated with a quantity of the product. The processor further cancels at least a portion of the second sell order placed with the second market center for placement with the first market center. The canceled portion of the second sell order is determined based at least in part upon the second trading information. The processor further routes at least one additional buy order to the first market center having a quantity that is based upon at least one of the first trading information and the canceled portion of the second sell order.

Various embodiments of the present invention may benefit from numerous advantages. It should be noted that one or more embodiments may benefit from some, none, or all of the advantages discussed below.

In general, the system of the present invention optimizes the processing of trading orders by routing trading orders to particular market centers based upon quantity. In particular, the trading platform of the system may aggregate trading orders for communication to a particular, preferred, market center. By aggregating trading orders, the system may reduce the overall number of trading orders that are communicated to market centers and, in doing so, the system may free up network resources in the system to perform other processes, such as to handle other trading orders. Therefore, these techniques may lead to faster and more efficient processing and routing of trading orders.

In addition, the trading platform of the present system stores trading information regarding previous trading orders (e.g., either buy orders or sell orders) that have been placed with various market centers. When the trading platform receives new trading orders for the same product (e.g., such as a buy order), it can refer to the stored trading information (e.g., such as for previous sell orders) to determine where to route the current trading orders in such a way that the trading orders can be fulfilled promptly. In other words, the trading platform can route current trading orders to particular market centers where it has a good chance of being matched with a prior trading order for the same product. By routing trading orders in this way, the trading platform of the present system allows the associated market centers to clear out previous trading orders from its queue and, in doing so, free up memory space and processing resources at the market center. This leads to a faster and more efficient trading system.

Other advantages will be readily apparent to one having ordinary skill in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF EXAMPLE EMBODIMENTS OF THE INVENTION

Figure 1:
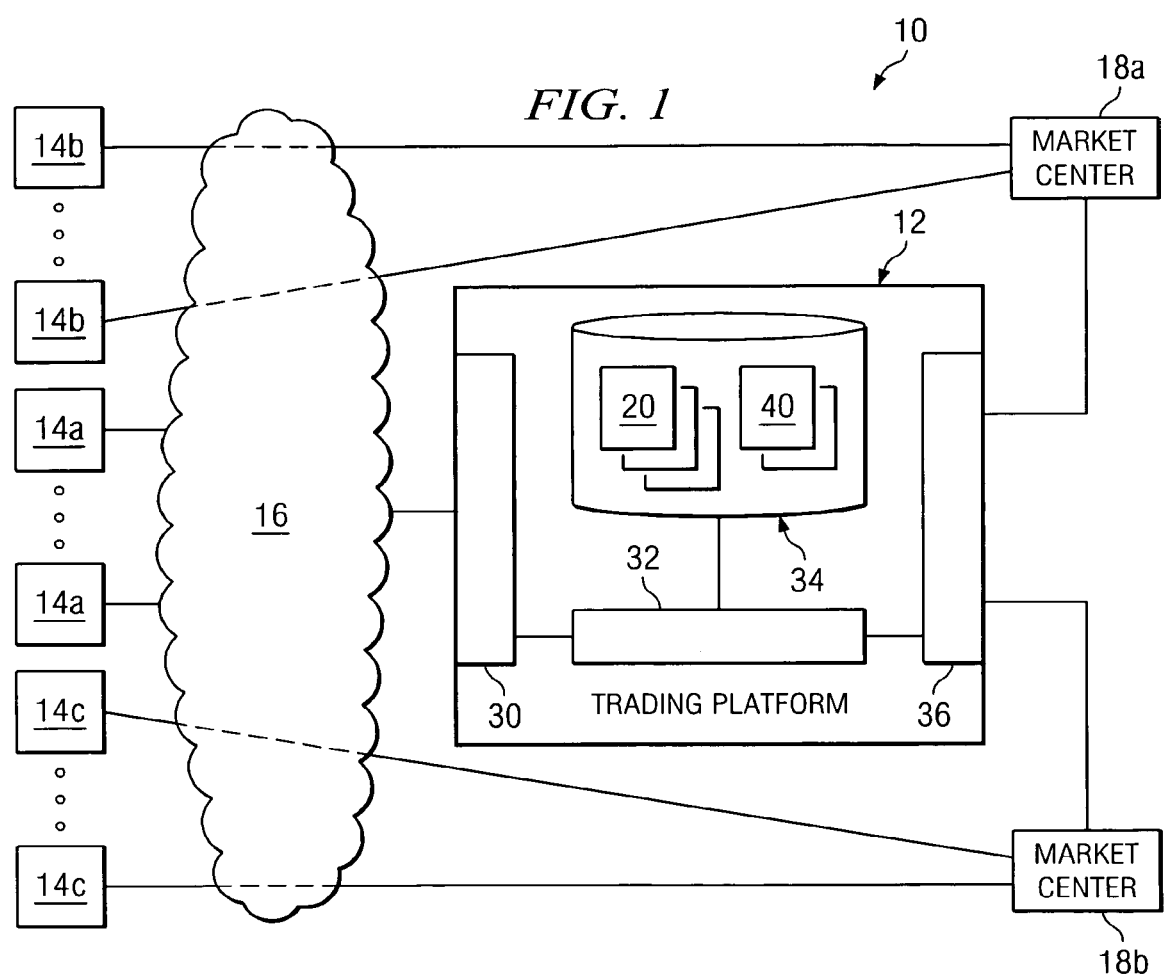
FIG. 1 illustrates one embodiment of a trading system in accordance with the present invention.

FIG. 1 illustrates one embodiment of a trading system 10 that includes a trading platform 12 coupled to a variety of clients 14 using network 16 and further coupled to market centers 18. In general, system 10 optimizes the processing of trading orders 20 by routing trading orders 20 to particular market centers 18 based upon the quantity of product indicated in the order 20 and the quantity of product available at one or more market centers 18.

A trading order 20 comprises an order to buy a particular quantity of a particular trading product (e.g., bid request) or an order to sell a particular quantity of a particular trading product (e.g., offer request). The quantity of the trading product to be bought or sold is referred to herein as the "total quantity." In particular embodiments, a trading order 20 may also specify a target price (e.g., target bid price and target offer price) for the trading product. Although the following description of system 10 is detailed with respect to trading equities, the trading product that forms the basis of a given trading order 20 may comprise any type of goods, services, financial instruments, commodities, etc. Examples of financial instruments include, but are not limited to, stocks, bonds, and futures contracts.

Clients 14 comprise any suitable local or remote end-user devices that may be used by traders to access one or more elements of trading system 10, such as trading platform 12. For example, a client 14 may comprise a computer, workstation, telephone, an Internet browser, an electronic notebook, a Personal Digital Assistant (PDA), a pager, or any other suitable device (wireless or otherwise), component, or element capable of receiving, processing, storing, and/or communicating information with other components of system 10. A client 14 may also comprise any suitable interface for a trader such as a display, a microphone, a keyboard, or any other appropriate terminal equipment according to particular configurations and arrangements. It will be understood that there may be any number of clients 14, such as clients 14a, coupled to trading platform 12. In addition, there may be any number of clients 14, such as clients 14b and 14c, coupled to market centers 18 without using trading platform 12. Clients 14a, 14b, and 14c shall be collectively referred to as clients 14.

Although clients 14 are described herein as being used by "traders," it should be understood that the term "trader" is meant to broadly apply to any user of trading system 10, whether that user is an agent acting on behalf of a principal, a principal, an individual, a legal entity (such as a corporation), or any machine or mechanism that is capable of placing and/or responding to trading orders 20 in system 10.

Network 16 is a communication platform operable to exchange data or information between clients 14 and trading platform 12 and/or market centers 18. Network 16 represents an Internet architecture in a particular embodiment of the present invention, which provides traders operating clients 14 with the ability to electronically execute trades or initiate transactions to be delivered to platform 12 and/or market centers 18. Network 16 could also be a plain old telephone system (POTS), which traders could use to perform the same operations or functions. Such transactions may be assisted by a broker associated with platform 12 or manually keyed into a telephone or other suitable electronic equipment in order to request that a transaction be executed. In other embodiments, network 16 could be any packet data network (PDN) offering a communications interface or exchange between any two nodes in system 10. Network 16 may further comprise any combination of local area network (LAN), metropolitan area network (MAN), wide area network (WAN), wireless local area network (WLAN), virtual private network (VPN), intranet, or any other appropriate architecture or system that facilitates communications between clients 14 and platform 12 and/or market centers 18.

Market centers 18 comprise all manner of order execution venues including exchanges, Electronic Communication Networks (ECNs), Alternative Trading Systems (ATSs), market makers, or any other suitable market participants. Each market center 18 maintains a bid and offer price in a given trading product by standing ready, willing, and able to buy or sell at publicly quoted prices, also referred to as market center prices.

Different market centers 18 provide different market center prices for particular trading products. For example, a particular market center 18 may offer a particular bid price and/or offer price for a particular trading product, while another market center 18 may offer a different bid price and/or offer price for the same trading product. Particular market centers 18 also charge a transaction cost in order to execute a trading order 20 that remains in their order book for more than a certain length of time.

In addition, different market centers 18 have adopted different policies regarding the disclosure to market makers of various details of a trading order 20, such as, for example, the size of a trading order 20. For example, a client 14 may place a trading order 20 with a "reserved quantity." Such a reserved quantity comprises a portion of the total quantity of the trading order 20, and allows the client 14 to enter a large order while having the market center 18 only display a portion of it to the rest of the market. In this case, a first quantity of the trading order 20 is "disclosed" and a second quantity of the trading order 20 is "reserved." Particular market centers 18, such as market center 18a, comprise "cooperative" market centers 18 in that they disclose both the disclosed quantity and the reserved quantity of a trading order 20 to trading platform 12. Other market centers 18, such as market center 18b, comprise "non-cooperative" market centers 18 in that they disclose the disclosed quantity of the trading order to trading platform 12, but do not disclose the reserved quantity of the trading order 20 to trading platform 12.

Trading platform 12 is a trading architecture that facilitates the routing, matching, and otherwise processing of trading orders 20. Platform 12 may comprise a management center or a headquartering office for any person, business, or entity that seeks to manage the trading of orders 20. Accordingly, platform 12 may include any suitable combination of hardware, software, personnel, devices, components, elements, or objects that may be utilized or implemented to achieve the operations and functions of an administrative body or a supervising entity that manages or administers a trading environment. In the particular embodiment described herein, trading platform 12 includes a number of interfaces, processors and memory devices that are executed to support the order processing activities of system 10.

Client interface 30 coupled to network 16 supports communication between clients 14 and the various components of platform 12. In a particular embodiment, client interface 30 comprises a transaction server that receives trading orders 20 communicated by clients 14.

Processor 32 is coupled to client interface 30 and performs a number of order handling tasks within platform 12. In particular, processor 32 records trading orders 20 in memory 34 and routes trading orders 20 to market centers 18. Processor 32 comprises any suitable combination of hardware and software implemented in one or more modules to provide the described function or operation. Processor 32 may execute program instructions stored in memory 34 and comprise processing components to execute the program instructions. Market center interface 36 supports communication between platform 12 and market centers 18.

Memory 34 comprises any suitable arrangement of random access memory (RAM), read only memory (ROM), magnetic computer disk, CD-ROM, or other magnetic or optical storage media, or any other volatile or non-volatile memory devices that stores one or more files, lists, tables, or other arrangements of information, such as trading orders 20 and trading information 40. Although FIG. 1 illustrates memory 34 as internal to trading platform 12, it should be understood that memory 34 may be internal or external to components of system 10, depending on particular implementations. Also, memory 34 illustrated in FIG. 1 may be separate or integral to other memory devices to achieve any suitable arrangement of memory devices for use in system 10.

It should be noted that the internal structure of trading platform 12, and the interfaces, processors, and memory devices associated therewith, is malleable and can be readily changed, modified, rearranged, or reconfigured in order to achieve its intended operations.

In operation, clients 14 place a variety of trading orders 20 with market centers 18 with or without the assistance of trading platform 12. Memory 34 stores trading information 40 associated with these trading orders 20. For any given trading order 20, trading information 40 may comprise information about whether the trading order 20 is a buy order or a sell order, the underlying trading product, the total quantity, pricing information, and any other suitable information regarding the trading order 20. For those trading orders 20 placed with market center 18a but not by trading platform 12, for example, trading information 40 may include both the disclosed quantity of the underlying trading product as well as the reserved quantity of the trading product. For those trading orders 20 placed with market center 18b but not by trading platform 12, for example, trading information 40 may include only the disclosed quantity of the underlying trading product. For those trading orders 20 placed with either market center 18a or 18b by trading platform 12, trading information 20 may include both the disclosed quantity of the underlying trading product as well as the reserved quantity of the trading product.

When trading platform 12 receives additional trading orders 20 from clients 14a, processor 32 routes additional trading orders 20 to one or more market centers 18 based upon trading information 40 stored in memory 34. For example, if trading platform 12 receives a sell order 20 associated with a quantity of a particular product, processor 32 routes at least one additional sell order 20 to one or more of market centers 18 based upon trading information 40 associated with previous buy orders 20 for the same product. Similarly, if trading platform 12 receives a buy order 20 associated with a quantity of a particular product, processor 32 routes at least one additional buy order 20 to one or more of market centers 18 based upon trading information 40 associated with previous sell orders 20 for the same product. While this description is detailed with reference to the trading platform 12 receiving one or more trading orders 20 and communicating additional trading orders 20 to market centers 18, it should be understood that one or more of the additional trading orders 20 may comprise some, none, or all of a trading order 20 received by trading platform 12.

In routing these additional trading orders 20 to market centers 18, trading platform 12 may show a preference for one market center 18, such as cooperative market center 18a, over another market center 18, such as non-cooperative market center 18b. In particular, trading platform 12 may seek to fulfill as much as possible of the total quantity of a trading order 20 for a particular product at market center 18a before seeking to fulfill any portion of the total quantity of the trading order 20 at market center 18b. In addition, where trading platform 12 previously placed a trading order 20, such as a buy order 20 for a particular product, with market center 18b, it may cancel such previous trading order 20 and place it at market center 18a so that a subsequently received trading order 20, such as a sell order 20 for the same product, may be fulfilled (at least in part) at market center 18a rather than market center 18b. The portion of the trading order 20 that is canceled at market center 18b and placed instead at market center 18a is based at least in part upon trading information 40.

Figures 2, 3:
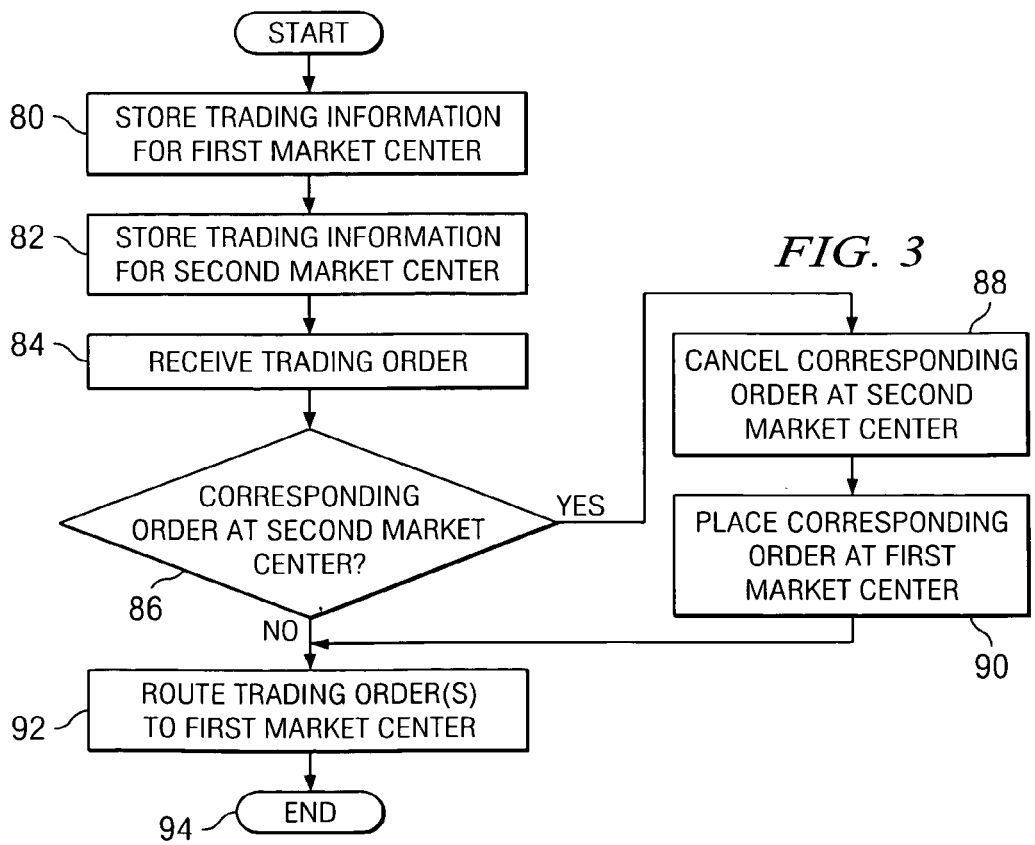
FIG. 2 illustrates one embodiment of trading information used by the system illustrated in FIG. 1.
FIG. 3 illustrates a flowchart of an exemplary method for routing trading orders.

FIG. 2 illustrates one embodiment of trading information 40 used by system 10. Trading information 40 is illustrated in a table having columns 50-58 and rows 60-72. Columns 50-58 illustrate at least a portion of the types of information that comprise trading information 40, including the type of trading orders 20 (e.g., buy order or sell order) in column 50; the product that is the subject of the trading order 20 in column 52; the disclosed quantity of the trading order 50 in column 54; the reserved quantity of the trading order 50 in column 56; and the market center 18a or 18a to which a particular trading order 20 was routed in column 58. Each row 60-72 represents a trading order 20 previously placed or currently in place with a market center 18, whether it was or was not placed by trading platform 12. It should be understood that trading information 40 may be stored in any suitable arrangement of data, whether formatted in a table or any other data structure.

Several examples of the operation of system 10 will now be described with reference to trading information 40 illustrated in FIG. 2. At the outset, however, suppose clients 14b placed trading orders 20 with market center 18a, as illustrated in rows 60 and 62, without the assistance of trading platform 12. In particular, the first trading order 20, illustrated in row 60, may be a buy order 20 for a product "XYZ" with a disclosed quantity of ten units and a reserved quantity of ten units. The second trading order 20, illustrated in row 62, may be a buy order 20 for the product "XYZ" with a disclosed quantity of ten units and a reserved quantity of zero units. Suppose further that clients 14c placed trading orders 20 with market center 18b, as illustrated in rows 64 and 66, without the assistance of trading platform 12. In particular, the first trading order 20, illustrated in row 64, may be a buy order 20 for a product "XYZ" with a disclosed quantity of ten units and a reserved quantity that remains unknown since market center 18b is "non-cooperative" with trading platform 12. The second trading order 20, illustrated in row 66, may be a buy order 20 for the product "XYZ" with a disclosed quantity of ten units and a reserved quantity that is unknown also.

Therefore, at this point, trading information 40 indicates that a disclosed quantity of forty units of product "XYZ" is being bid upon at market centers 18a and 18b (as indicated by rows 60-66 at column 54), that a reserved quantity of ten units of product "XYZ" is being bid upon at market center 18a (as indicated by row 60 at column 56), and that an unknown reserved quantity of product "XYZ" is being bid upon at market center 18b (as indicated by rows 64 and 66 at column 56).

In the first example operation, assume that trading platform 12 receives a sell order 20 for product "XYZ" for a total quantity of thirty units. Assume further that platform 12 preferences cooperative market center 18a in its order routing decisions. Because platform 12 stores trading information 40 indicating that thirty units of product "XYZ" is currently being bid upon in market center 18a, trading platform 12 routes a sell order 20 for product "XYZ" for the total quantity of thirty units to market center 18a where it can be fulfilled. By fulfilling as much as possible (e.g., thirty units) of the total quantity of the sell order 20 (e.g., thirty units) at market center 18a to the exclusion of market center 18b, trading platform 12 exhibits a preference for cooperative market center 18a in its order routing process.

In the second example operation, assume that trading platform 12 receives a sell order 20 for product "XYZ" for a total quantity of fifty units. Assume further that platform 12 preferences cooperative market center 18a in its order routing decisions. Because trading information 40 indicates that thirty units of product "XYZ" is currently being bid upon in market center 18a, trading platform 12 routes a sell order 20 for product "XYZ" for a quantity of thirty units to market center 18a where it can be fulfilled. Because trading platform 12 indicates that twenty units of product "XYZ" is currently being bid upon in market center 18b, trading platform 12 routes a sell order 20 for product "XYZ" for the remaining quantity of twenty units to market center 18b where it can be fulfilled. By fulfilling as much as possible (e.g., thirty units) of the total quantity of the sell order 20 (e.g., fifty units) at market center 18a before fulfilling the remainder (e.g., twenty units) at market center 18b, trading platform 12 exhibits a preference for cooperative market center 18a in its order routing process.

In the third example, assume further that trading platform 12 receives an additional buy order 20 for product "XYZ" in the amount of twenty units (e.g., ten units disclosed and ten units reserved) from a client 14a. Per the instructions of client 14a, assume that trading platform 12 places a buy order 20 with market center 18a for product "XYZ" with a disclosed quantity of five units and a reserved quantity of five units, as illustrated in row 68. Assume further that trading platform 12 places a buy order 20 with market center 18b for product "XYZ" with a disclosed quantity of five units and a reserved quantity of five units, as illustrated in row 70. At this point, trading information 40 indicates that a disclosed quantity of fifty units of product "XYZ" is being bid upon at market centers 18a and 18b (as indicated by rows 60-70 at column 54), that a reserved quantity of fifteen units of product "XYZ" is being bid upon at market center 18a (as indicated by rows 60 and 68 at column 56), and that a reserved quantity of five units of product "XYZ" is being bid upon at market center 18b (as indicated by row 70 at column 56).

Now, assume that trading platform 12 receives a sell order 20 for product "XYZ" for a total quantity of seventy-five units. Assume further that platform 12 preferences cooperative market center 18a in its order routing decisions. Because trading information 40 indicates that a total of forty units of product "XYZ" is currently being bid upon in market center 18a (as indicated by rows 60, 62, and 68), trading platform 12 routes a sell order 20 for product "XYZ" for a quantity of forty units to market center 18a where it can be fulfilled. Next, trading information 40 indicates that trading platform 12 placed with market center 18b a buy order 20 for product "XYZ" for a disclosed quantity of five units and a reserved quantity of five units, for a total quantity of ten units (as indicated in row 70). Assume further that platform 12 preferences cooperative market center 18a in its order routing decisions. As a result, platform 12 cancels the buy order 20 placed with market center 18b detailed in row 70 (as indicated by the dashed line through row 70) and, instead, places the buy order 20 with market center 18a (as indicated in row 72). Now, trading information 40 indicates that ten units of product "XYZ" is currently being bid upon in market center 18a (as indicated by row 72). Therefore, trading platform 12 routes a sell order 20 for product "XYZ" for a quantity of ten units to market center 18a where it can be fulfilled. The cancellation of the buy order 20 with market center 18b and the placement of the buy order 20 with market center 18a may occur simultaneously or sequentially in time.

Of the original quantity of seventy-five units in the sell order 20 received by trading platform 12, fifty units have now been fulfilled at market center 18a, leaving an additional twenty-five units unfulfilled. However, trading information 40 indicates that twenty units of product "XYZ" is currently being bid upon in market center 18b (as indicated by rows 64 and 66). Therefore, trading platform 12 routes a sell order 20 for product "XYZ" for a quantity of twenty units to market center 18b where it can be fulfilled. The five units of the sell order 20 that remain unfulfilled may be routed to market center 18a, market center 18b, or both per the instructions of the client 14a or the order routing priorities of trading platform 12. By fulfilling as much as possible (e.g., forty units) of the total quantity of the sell order 20 (e.g., seventy-five units) at market center 18a, and by canceling a buy order 20 previously placed with market center 18b (e.g., for ten units) for placement at market center 18a so that another ten units of the sell order 20 could be fulfilled at market center 18a, trading platform 12 exhibits a preference for cooperative market center 18a in its order routing process.

Although the previous examples are detailed with reference to trading information 40 detailing buy orders 20 and trading platform 12 routing sell orders 40 accordingly, it should be understood that trading information 40 can detail any number and combination of buy orders 20 and sell orders 20, and that trading platform 12 can route any number and combination of buy orders 20 and sell orders 20 using the techniques described above.

FIG. 3 illustrates a flowchart of an exemplary method for routing trading orders 20. The method begins at steps 80 and 82 where trading platform 12 stores trading information 40 associated with one or more trading orders 20 (e.g., buy orders 20 and/or sell orders 20 for a particular product) placed with market center 18a, and trading information 40 associated with one or more trading orders 20 (e.g., buy orders 20 and/or sell orders 20 for a particular product) placed with market center 18b. At least a portion of this trading information 40 may be associated with trading orders 20 placed with market centers 18a or 18b by trading platform 12. Execution proceeds to step 84 where trading platform 12 receives a trading order 20 (e.g., buy order 20 or sell order 20) for a particular quantity of the particular product.

At step 86, trading platform 12 determines whether a corresponding trading order 20 for the particular product was placed by trading platform 12 at market center 18b. For example, if the trading order 20 received at step 84 is a buy order 20, trading platform 12 determines at step 86 whether a sell order 20 for the particular product was placed by trading platform 12 at market center 18b. If the trading order 20 received at step 84 is a sell order 20, trading platform 12 determines at step 86 whether a buy order 20 for the particular product was placed by trading platform 12 at market center 18b. If so, execution proceeds to step 88 where trading platform 12 cancels at least a portion of the corresponding order 20 at market center 18b. Execution proceeds to step 90 where trading platform 12 places the corresponding order 20 at market center 18a.

Upon placing the corresponding order 20 at market center 18a at step 90, or upon determining that a corresponding order 20 was not placed by trading platform 12 at market center 18b at step 86, execution proceeds to step 92 where trading platform 12 routes one or more trading orders 20 to market center 18a to fulfill at least a portion of the trading order 20 received at step 84. The trading order 20 received at step 84 may be fulfilled at least in part by corresponding trading orders 20 that were originally placed at market center 18a (whether by trading platform 12 or not) and/or by corresponding trading orders 20 that were placed at market center 18a by trading platform 12 at step 90 in association with a corresponding trading order 20 that was canceled at market center 18b at step 88. In this regard, trading platform 12 exhibits a preference for cooperative market center 18a in its order routing process.

Although the present invention has been described in several embodiments, a myriad of changes and modifications may be suggested to one skilled in the art, and it is intended that the present invention encompass such changes and modifications as fall within the scope of the present appended claims.

What is claimed is:

1. An apparatus comprising
a memory;
a network interface;
at least one processor to:
store, in the memory, data indicative of trading orders, an execution venue indicator for each trading order, and a quantity for each trading order;
receive, via the network interface, a packet of data indicative of a new trading order for a product with a new trading order quantity;
search the memory for historical trading information regarding the product;
identify, in the historical trading information, a single execution venue that is capable of fulfilling as much as possible of the new trading order for the product such that routing the new trading order to the single execution venue minimizes a number of overall trading orders communicated via a network;
route, via the network interface, the new trading order to the identified single execution venue; and
determine whether there is a second corresponding order for the product in a second execution venue different from the single execution venue; and
cancel the second corresponding order in the second execution venue, in response to determining that the second corresponding order is in the second execution venue; and
insert the second corresponding order in the identified single execution venue.

2. The apparatus of claim 1, wherein the single execution venue is a cooperative execution venue that transmits reserved quantity information to the at least one processor.

3. The apparatus of claim 1, wherein at least one other execution venue different from the single execution venue comprises at least one of an electronic communication network, an alternative trading system, and a market maker.

4. The apparatus of claim 1, wherein the new trading order quantity comprises a reserved quantity that is not publicly displayed.

5. The apparatus of claim 4, wherein at least one other execution venue different from the single execution venue is a non-cooperative execution venue that does not transmit reserved quantity information to the at least one processor.

6. A method comprising:
storing, by at least one processor, in a memory, data that indicates trading orders, an execution venue indicator for each trading order, and a quantity for each trading order;
receiving, via a network interface, by the at least one processor, a packet of data indicative of a new trading order for a product, the new trading order comprising a new trading order quantity;
searching, by the at least one processor, the memory for historical trading information regarding the product;
identifying, by the at least one processor, a single execution venue in the historical trading information that is capable of fulfilling as much as possible of the new trading order for the product, such that routing the new trading order to the single execution venue minimizes a number of overall trading orders communicated via a network;
routing, by the at least one processor, the new trading order to the single execution venue via the network interface;
determining, by the at least one processor, whether there is a second corresponding order for the product in a second execution venue different from the single execution venue; and
cancelling, by the at least one processor, the second corresponding order in the second execution venue, in response to determining that the second corresponding order is in the second execution venue; and
inserting, by the at least one processor, the second corresponding order in the identified single execution venue.

7. The method of claim 6, wherein the single execution venue is a cooperative execution venue that transmits reserved quantity information to the at least one processor.

8. The method of claim 6, wherein at least one other execution venue different from the single execution venue comprises at least one of an electronic communication network, an alternative trading system, and a market maker.

9. The method of claim 6, wherein the new trading order quantity comprises a reserved quantity that is not publicly displayed.

10. The method of claim 6, wherein at least one other execution venue different from the single execution venue is a non-cooperative execution venue that does not transmit reserved quantity information to the at least one processor.

* * * * *